United States Patent [19]

Cebuhar

[11] 4,022,036

[45] May 10, 1977

[54] TAMPERPROOF SECURITY DEVICE FOR EQUIPMENT AND METHOD OF PROTECTION

[76] Inventor: Stanley W. Cebuhar, 3130 E. 67th St., Tulsa, Okla. 74105

[22] Filed: Dec. 19, 1975

[21] Appl. No.: 642,600

[52] U.S. Cl. .................................... 70/58; 70/232; 248/19; 248/203

[51] Int. Cl.² .................... F16B 41/00; E05B 73/00

[58] Field of Search ................ 70/57, 58, 232, 418; 292/34 C; 248/203, 19, 23, 25, 205 A

[56] References Cited

UNITED STATES PATENTS 3,850,392 11/1974 Gessaway ............................ 248/19

3,874,717 4/1975 Pratt .................................. 292/346

*Primary Examiner*—Robert L. Wolfe

[57] ABSTRACT

A security device for the protection of equipment such as typewriters, televisions, office equipment in general and other personal property comprising an anchor pad including a bottom adhesive side for attachment to a desk or table top or the like and an upper adhesive side carrying a plurality of metal plates. An enclosing cover for the anchor pad has an internal periphery greater than the anchor pad, measured along the table top, to leave a space between said peripheries along the entire length thereof.

The cover includes enclosed connection means for cooperation with the anchor pad to lock thereto through the use of externally inserted locking rods, in turn locked in place by key operated locks. Within the cover and penetrating the same upwardly are attachment means for connection, via equipment mounting discs retained to the cover by the penetrating means, to the equipment to be protected. Additional security means are enclosed within the cover, in tension engagement with the desk or table top, to preclude breaking of the adhesive attachment. The additional means may comprise a spring metal peripheral skirt attached to the metal plates of the adhesive means and biased against the table top or internally attached to the cover and biased against the desk or table top or may comprise spring clips penetrating the metal plates and pad and tensioned against the desk or table top — all precluding breaking of the adhesive attachment through the weight of the protected equipment tensioning the additional security means.

12 Claims, 11 Drawing Figures

TAMPERPROOF SECURITY DEVICE FOR EQUIPMENT AND METHOD OF PROTECTION

The present invention relates to an improved equipment security device for protecting personal property such as office machines, televisions and the like by securely affixing them to a desk or table top or other flat surface in tamperproof manner, access being had for removal through the use of one or more keys and key operated locks. It comprises an adhesive pad including metal plates on the top thereof with the bottom adhesive surface being provided for attachment to the table top. The metal plates include raised ribs at spaced apart intervals in alignment to define at least one passageway for a locking rod. An enclosing cover is provided with depending apertured lugs for completely surrounding and covering the adhesive pad with the apertures of the lugs aligning with the passageway of the raised ribs such that the locking rod securely attaches the cover to the pad. Screws or the like penetrate the cover and receive discs at spaced apart positions, which discs are adhesively connected to the underside of the equipment to be protected. Additional security means are included within the cover in tension engagement with the table top to preclude breaking of the adhesive attachment.

The latter means may comprise a spring steel or the like metal skirt extending about the periphery of the adhesive pad and spot welded or otherwise attached to the metal plates affixed thereto. This skirt is biased against the table top by the weight of the equipment pressing downwardly. It may further be equipped with spaced apart clips internally thereof also biased against the table top in an opposite arcuate direction to provide a bifurcated gripping action at each clip. The clips may comprise punch-out tabs from the spring steel skirt. Alternatively, the spring steel skirt with or without clips may depend from the internal periphery of the cover, from a side wall or the top wall inner surface, being riveted or spot welded thereto, to provide the same type action. Thirdly, and in lieu of the skirt, a plurality of spring clips may penetrate the steel plates and pad at spaced apart positions, being affixed to the metal plates and bearing against the table top such that a similar type tensioning action is provided for maintaining the adhesive seal tamperproof.

The prior art is typified by U.S. Letters Pat. No. 3,850,392 to James S. Gassaway issued Nov. 26, 1974. This art generally discloses the above elements with the exception of the additional security means. However, the prior art, while providing a useable and acceptable protection device which certainly would deter a person from appropriating a secured device if other devices were present, nevertheless, is not quite tamperproof. It has been found that a piano wire, for example, can be worked beneath the adhesive pad to break the seal and permit the device to be carried off. Thus, the reason for the present invention is to render security equipment devices tamperproof.

The invention will be better understood from a reading of the following detailed description thereof when taken in light of the accompanying drawings wherein.

Figure 1:
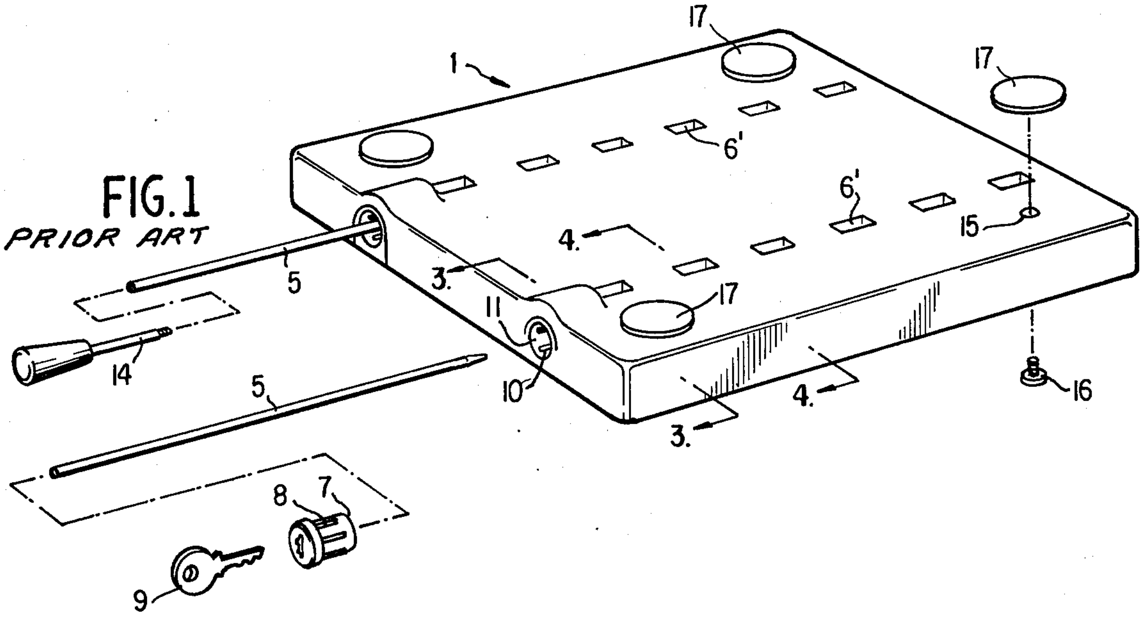
FIG. 1 PRIOR ART
FIG. 1 is an exploded view in perspective showing a security device in external view.
Figure 2:
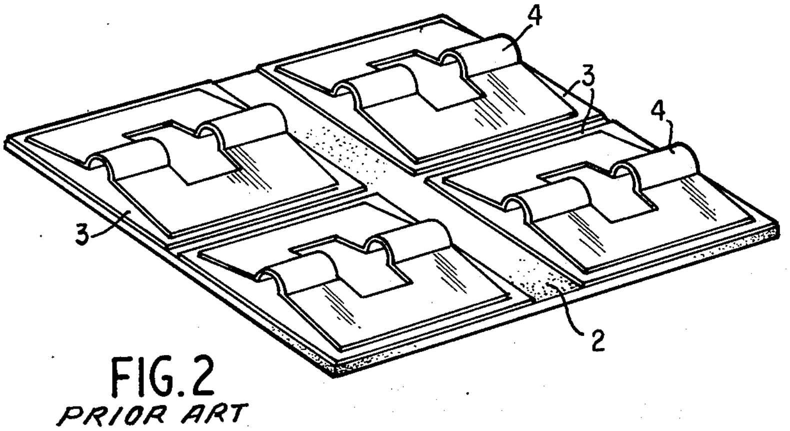
FIG. 2 PRIOR ART
FIG. 2 is a view of the adhesive pad in perspective.
Figure 3:
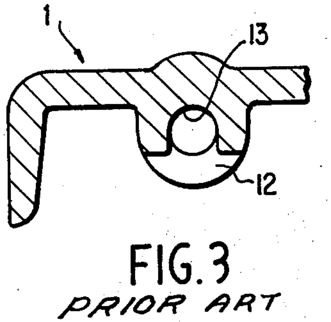
FIG. 3 PRIOR ART
FIG. 3 is a sectional view through the cover of FIG. 1 along the plane 3—3.
Figure 4:
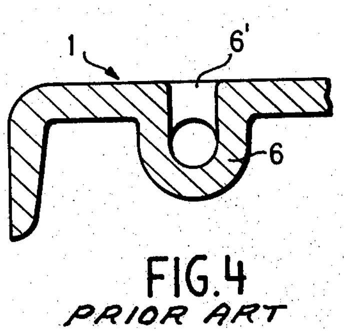
FIG. 4 PRIOR ART
FIG. 4 is a similar sectional view along the plane 4—4.

FIGS. 1, 2, 3 and 4 in general depict the prior art showing a die casting enclosing cover which completely covers an adhesive pad 2 which includes, e.g., four metal plates 3 adhesively affixed to the top thereof in spaced apart positions. Each plate carries, welded thereto, a further plate forming raised ribs or arches 4. The arches 4 of a pair of oppositely spaced plates 3 are in alignment to define a passageway for the locking rods 5. The reason for the spaced apart arches or raised ribs 4 is to mesh with depending apertured lugs 6 (FIGS. 4 and 7) carried by cover 1 so that the locking rods connect the cover to the adhesive pad 2. The lugs 6 depend from cover 1 at the open locations 6' shown in FIG. 1.

The locking rods 5 are maintained in position by locks 7 which includes spaced apart rows of spring biased radially retractable pins or ridges 8, operable by key 9 to cooperate with ridges or recesses 10 in the lock receiving aperture 11. The lock receiving aperture 11 includes a die cast shoulder 12 (FIG. 3) in which it is formed and may also include a threaded aperture 13 for receiving a threaded portion of lock 7. In any event, the lock is conventional in nature and merely permits locking the aperture 11 so that the rods 5 may not be extricated without the proper keys. An extractor tool 14 may be included to permit ready removal of rods 5, being threadably engageable with the rod ends.

In order that the security device may be remotely attached to the equipment to be guarded, spaced apart apertures, such as 15, are provided in cover 1 to permit attachment screws 16 to threadably engage adhesive discs 17 from within cover 1 by penetrating the same at spaced apart locations. The discs 17 include a metal disc with an adhesive covering and the apertures 15 are located in suitable locations so that the discs 17 provide flat engagement with the protected equipment. Degreasing techniques are followed and a few drops of adhesive are applied to the disc 17 to receive the equipment to be guarded.

Figure 5:
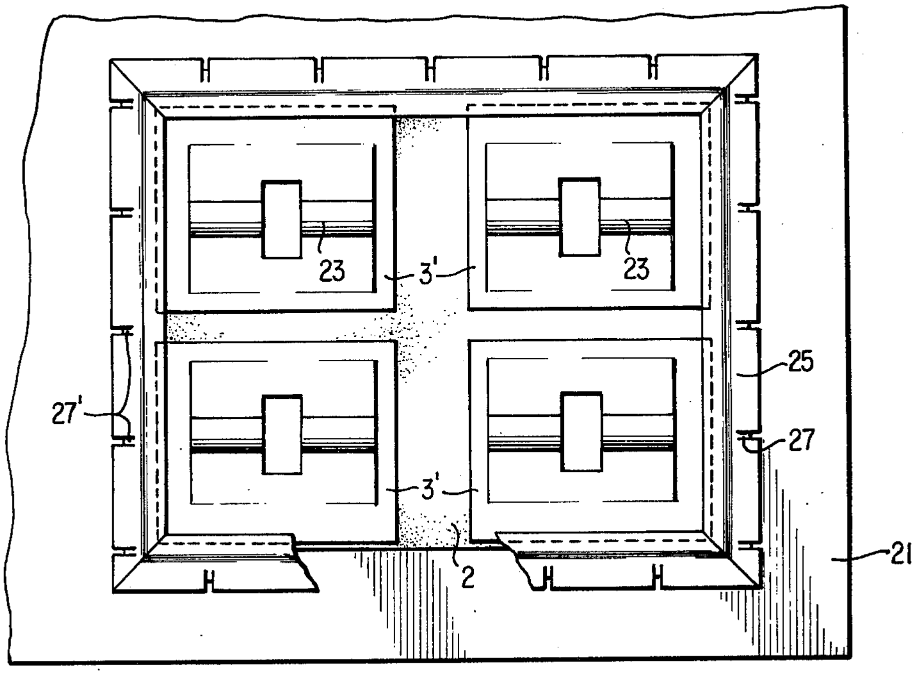
FIG. 5 is a plan view of the adhesive pad incorporating the additional security skirt in accordance with the present invention.

FIGS. 5 through 11 depict various modifications of the present invention. In FIG. 5, a flat surface 21 such as a desk or table is shown with the adhesive pad 2 being in adhesive attachment thereto. Pad 2 usually comprises a foamed plastic with layers of permanent adhesive material affixed to its lower and upper surfaces, the lower surface being provided for engagement with top 21 and the upper surface for retaining metal plates 3'. In FIG. 5, the metal plates are shown with raised cut-out ribs 23. These ribs may be punched out of the steel plates 3' and arcuate central sections welded thereto to provide a continuous rib, the arcuate central sections serve better to define the passageway for the locking rods 5.

Figure 6:
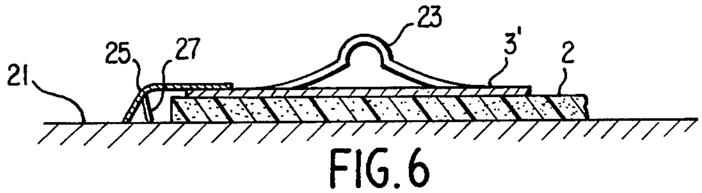
FIG. 6 is a partial sectional view of FIG. 6 showing the protective skirt in detail.

The metal skirt, preferably spring steel, is shown at 25. It is preferably spot welded to the external sides of the four metal plates 3' , extending about the entire periphery of pad 2 and depending toward and into contact with top 21 (FIG. 6). In FIG. 6, the cross-sectional configuration of skirt 25 is a slightly reversed curvature and a plurality of spaced apart clips 27 generally provide a bifurcated view such that tensioning downwardly, due to the weight of the equipment, causes the additional security means 25 and 27 to bite into or bear heavily against top 21. The lower edges of the skirt 25 and clips 27 may be as sharp as 0.0005 of an inch in thickness and the contact region is a peripheral space between the outer periphery of pad 2 and the inner periphery of cover 1. The clips 27 may be separately spot welded to the spring steel skirt or may be formed from cutouts 27' (FIG. 5). Alternatively the clips 27 may comprise an inner continuous skirt, but in any event the combination precludes penetration of the seal by piano wire, screwdrivers, putty knives or the like, piano wires simply being directed upwadly away from the seal.

Figure 7:
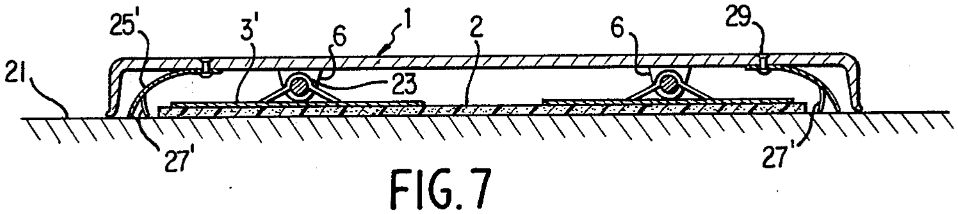
FIG. 7 is a view in section through the entire security device showing a different type additional security skirt attached to the inner top wall of the cover.
Figure 8:
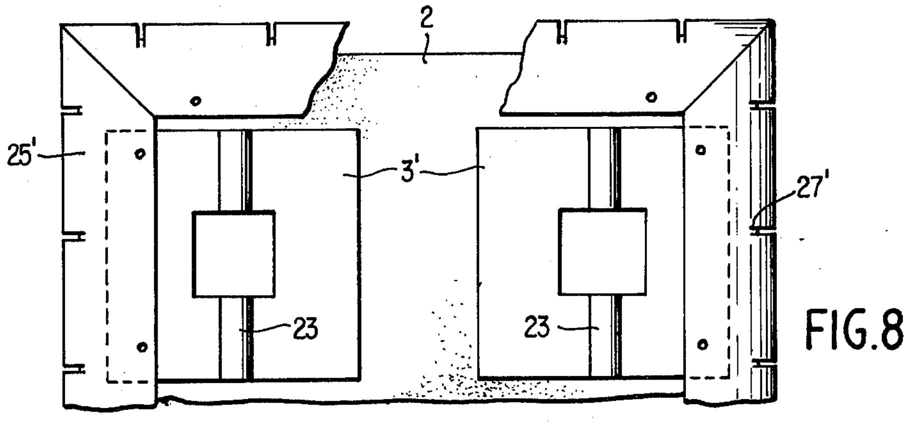
FIG. 8 is a view in plan of FIG. 7 with the cover removed.

FIGS. 7 and 8 show a modification of the invention wherein preferably a spring steel peripheral skirt 25' is riveted as 29 to the top surface 31 of cover 1. In lieu of riveting, spot welding may be employed here also.

The configuration of skirt 25' is slightly different in that an arcuate curvature is followed from cover 1 to top surface 21 for a better biting engagement. Also, of course, if desired, the clips or clip skirt 27 of FIG. 6 may be incorporated with skirt 25', but in any event, the engagement between the skirt and surface 21 is in the peripheral space between pad 2 and cover 1. Also, the depending apertured lugs 6 of cover 1 are visible and are shown in cooperation with the raised ribs 23 for the steel interlocking rods 5.

FIG. 8 merely shows a portion of FIG. 7 to indicate the peripheral span of skirt 25', the cover 1 being removed.

Figure 9:
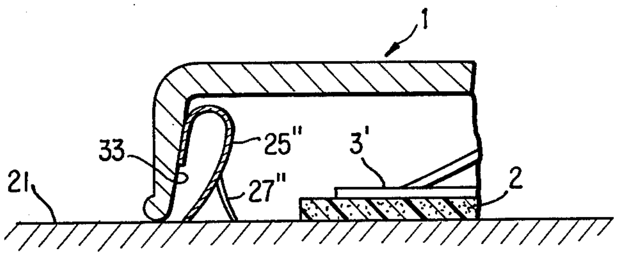
FIG. 9 is a partial view in section through the security device showing a modified spring steel skirt attached to the internal side wall of the cover.

In FIG. 9, the skirt 25'' is shown spot welded or riveted to the side wall 33 and depending in tension engagement with top 21. While the curvature is shown depending outwardly, it may also assume a slight S-shaped configuration to depend inwardly toward pad 2 and metal plate 3'.

Figure 10:
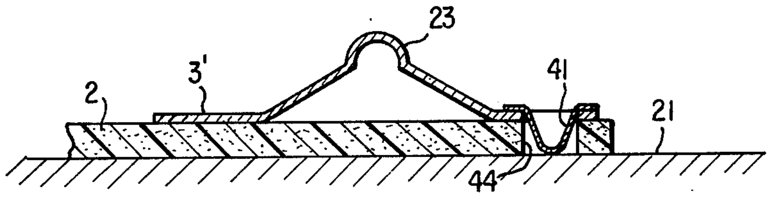
FIG. 10 is a further modification of the invention to show the additional security means as spring tension steel U-shaped clips penetrating the adhesive pad and affixed to the metal plates to provide tension against the desk or table top; and, FIG. 11 is a partial plan view of FIG. 10.
Figure 11:
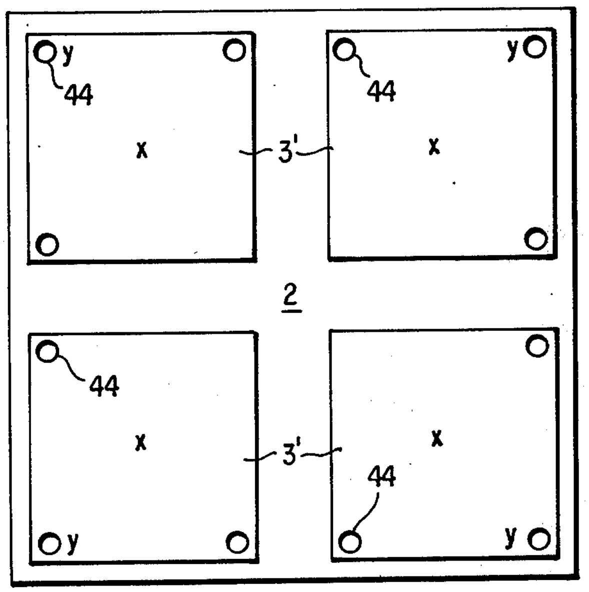

FIGS. 10 and 11 show the use of a plurality of U-shaped spring clips 41 penetrating metal plates 3' and pad 2, being affixed to outer walls of apertures such as 44 or the top surface of plates 3' as by spot welding to bear against top 21 being urged tightly thereagainst by the weight of the equipment. The spring tension prevents the wire from breaking the adhesive seal.

At least twelve locations are desirable as shown by the apertures 44 in the plates 3' in FIG. 11. These locations protect the integrity of the seal between pad 2 and top 21. If desired, however, a different plurality of apertures and associated U-shaped clips could be employed such as four clips centrally respectively of the plates 3' or merely four clips protecting the outermost corners of the metal plates 3'.

In the embodiments of FIGS. 5, 7 and 9, the skirts could curve inwardly to the top and the spring clips outwardly. In such event, the skirt would urge the clips downwardly in the manner of a spaced apart tensioned timed defense, but the arrangements illustrated are preferred.

In FIG. 7, the optional clips are shown at 27' and in FIG. 9 at 27''.

Also, in FIG. 11, the optional locations of pluralities of U-shaped clips 41 are shown respectively at *y* and *x*.

What is claimed is:

1. A security device for equipment protection comprising in combination,
   - an anchor pad means for adhesive attachment to a table top or the like;
   - an enclosing cover for the anchor pad means having a periphery greater than the periphery of the anchor pad means along the table top to leave a space between said peripheries along the full extent thereof;
   - locking means, including a portion of said anchor pad means and a portion of said cover for locking the cover to the anchor pad means;
   - attachment means penetrating the cover for securing the equipment thereto; and,
   - additional security means attached to the device within the cover in tension engagement with the table top to preclude breaking of said adhesive attachment.

2. The device of claim 1 wherein the additional security means is a spring metal skirt depending from the cover to bear against the table top along said space.

3. The device of claim 2 wherein said skirt is attached along the inner side wall of said cover extending inwardly thereof and depending outwardly to bear against the said top.

4. The device of claim 2 wherein said skirt is affixed to the inner top of said cover and is configured arcuately outwardly to bear against said top.

5. The device of claim 3 further comprising spring clips located at spaced apart positions internally along said skirt and depending therefrom inwardly thereof to bear against said top.

6. The device of claim 4 further comprising spaced apart spring clips located at spaced apart positions internally along said skirt and depending therefrom inwardly thereof to bear against said top.

7. The device of claim 1 wherein said anchor pad means comprises an adhesive pad and a plurality of metal plates affixed to the upper surface of said pad in spaced apart locations and wherein the additional security means is a spring metal skirt attached to said metal plates and depending therefrom along the periphery of said pad to bear against the top in tension engagement therewith along said space.

8. The device of claim 7 further comprising spring clips located at spaced apart positions internally along said skirt and depending therefrom inwardly thereof to bear against said top.

9. The device of claim 1 wherein said anchor pad means comprises an adhesive pad and a plurality of metal plates affixed to the upper surface of said pad in spaced apart locations; and wherein the additional security means is a plurality of U-shaped spring clips respectively attached to said metal plates at spaced apart hole locations through the plates and pad to bear against said top in tension engagement therewith.

10. The method of enhancing the effectiveness of a security device for equipment including an adhesive pad in attaching engagement with a table top or the like which pad carries a plurality of spaced apart metal plates, the combination being enclosed by a cover and locked thereto with the equipment attached to the cover, from within the cover, comprising the steps of:

affixing additional spring steel enhancing security means between the device and the top and extending about the periphery of the pad within the cover to bear against said top; and, utilizing the weight of the equipment to tension the spring steel means against said top.

11. A security device for equipment protection to preclude a wire, or jimmy from separating the equipment from a table top or the like, comprising in combination;

anchor pad means for adhesive attachment to said table top or the like;

a plurality of metal plates affixed to the upper surface of said pad in spaced apart locations;

an enclosing cover for the anchor pad means having a periphery greater than the periphery of the anchor pad means along the table top to leave a space between said peripheries along the full extent thereof;

locking means, including a portion of said anchor pad means and a portion of said cover for locking the cover to the anchor pad means;

attachment means penetrating the cover for securing the equipment thereto;

said metal plates each having a plurality of spaced apart holes therethrough; and, a plurality of additional security means attached to the device within the cover and extending respectively through said holes and yieldablly held against the table top to deflect any wire or jimmy to preclude breaking of said adhesive attachment beyond the additional security means.

12. A security method for equipment protection to preclude a wire or jimmy from separating the equipment from a table top or the like, comprising the steps of;

attaching an anchor pad by adhesive attachment to said table top;

attaching a plurality of metal plates adhesively to the upper surface of said pad in spaced apart locations;

enclosing the anchor pad means with a cover having a periphery greater than the periphery of the anchor pad means along the table top to leave a space between said peripheries along the full extent thereof;

interlocking said anchor pad means and said cover;

affixing the equipment to the cover;

forming a plurality of spaced aparts holes in said metal plates; and, attaching a plurality of additional security means to the device, within the cover, extending respectively through said holes and held against the table top, being yieldable in the holes to deflect any wire or jimmy to preclude breaking of said adhesive attachment beyond the additional security means.

* * * * *